Sept. 19, 1939.  L. T. SACHTLEBEN  2,173,266
OPTICAL SYSTEM
Filed Jan. 29, 1938

Lawrence T. Sachtleben, Inventor

By [signature]

Attorney

Patented Sept. 19, 1939

2,173,266

UNITED STATES PATENT OFFICE 2,173,266

OPTICAL SYSTEM

Lawrence T. Sachtleben, Camden, N. J., assignor to Radio Corporation of America, a corporation of Delaware Application January 29, 1938, Serial No. 187,595

5 Claims. (Cl. 88—24)

This invention relates to optical systems such as are utilized in the recording of audio frequency or other electrical impulses, and has for its principal object the provision of an improved system and method of operation whereby various types of distortion, heretofore encountered in the operation of such systems, are avoided.

It is customary in a conventional electrical impulse recorder of the galvanometer type to apply light to the vibratable galvanometer reflector through a path which is displaced by 15 degrees to one side of the normal to the rotational axis of the reflector, and to receive the reflected light through a path which is displaced to the opposite side of this normal by a similar angle of 15 degrees. Centered on the axis of the path through which light is applied to the reflector are a light aperture of triangular or other suitable shape and a lens through which the aperture is imaged on the light slit. This aperture image is reflected through one or more lenses to a light slit across which it is vibrated in accordance with the electrical impulses applied to the operating coil of the galvanometer, and the impulse modulated light emerging from the slit is applied to a photographic record strip which is moved transversely of the slit. Under these conditions, the impulses are recorded on the strip in the form of a variable area record track.

In order to avoid various types of image distortion, it has been customary heretofore to mount the lens through which the aperture is imaged on the light slit so that this lens is out of the path of the light received from the reflector. While this arrangement of the lens is satisfactory where no restrictions are imposed on the dimensions of the optical system, it is impractical in the case of a very compact optical system, for the reason that the aperture imaging lens must be mounted so close to the galvanometer reflector that both the incident and reflected light pass through it.

There is therefore encountered the problem of providing a lens which may be utilized in the foregoing environment without image bias, coma, chromatic difference of magnification, spherical aberration, astigmatism, and other types of distortion. In accordance with the present invention, this difficulty is solved by the provision of an improved optical system including a window lens which is meniscus in form with the concave side toward the reflector, and is so designed that, when working at a one to one magnification, a field whose center of curvature is at the reflector will be imaged so that the primary image surface will also have its center of curvature at the mirror. As will be understood, the provision of such a lens is highly advantageous for the reason that it renders the aperture image free of coma and distortion and permits the image to be accurately located in a plane at right angles to the axis of the path along which light is received from the reflector so that it is at all times properly focused at the light slit.

The invention will be better understood from the following description considered in connection with the accompanying drawing, and its scope is indicated by the appended claims.

Referring to the drawing.

Figure 1:
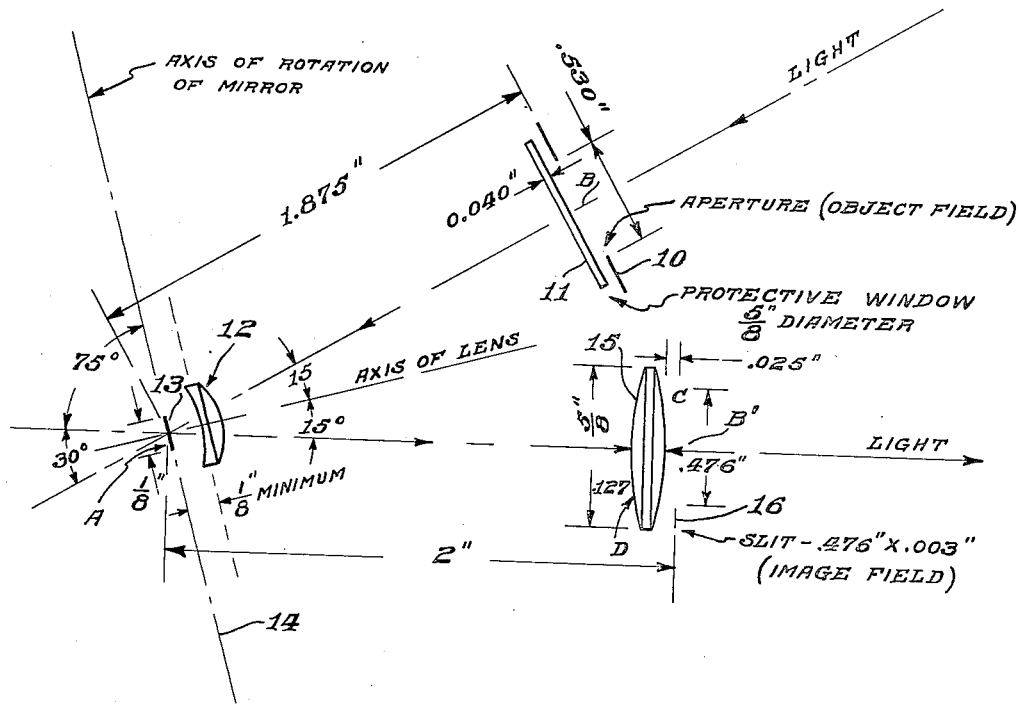
Figure 1 illustrates a preferred embodiment of the invention.

The system of Fig. 1 includes an aperture plate 10, a protective window 11 for excluding dust and the like from the aperture, and a meniscus lens 12 and a mirror 13 through which the aperture of the plate 10 is imaged on the light slit of the plate 16. The mirror 13 is arranged to be rotated or vibrated about the axis 14 in response to the electrical impulses applied to its operating coil (not shown). Light from the source image produced on the mirror 13 is passed through the lens 12 and a lens 15 to an image of the aperture plate 10 at the light slit of a plate 16. The aperture of the plate 10 may be of triangular or any other suitable shape such that the light emerging from the slit is modulated in accordance with the electrical impulses applied to the mirror operating coil and may be applied to a photographic recording surface moved at a constant rate of speed transversely of the slit.

Since suitable galvanometer constructions and film moving mechanisms are well known and form no part of the present invention, they have been omitted from the drawing. It is also apparent that any suitable source of light may be provided for illuminating the aperture of the plate 10. How the various available light sources, galvanometers and record moving mechanisms may be applied in connection with the present invention is too well understood by those skilled in the art to require detailed consideration.

The exact design of the lens 12 is of great importance if the image of the aperture of the plate 10 at the light slit is to be free of coma and distortion and is to lie in a plane parallel with the light slit. The symmetrical object and image, in which B and B' are conjugate points, will in general lie on curved surfaces either convex or concave toward the aperture. The shape or curvature of these symmetrical pairs of object and image surfaces may be adjusted by modifying the shape of the lens and its distance from the aperture, thereby modifying the extent of the eccentric refraction of the oblique pencils or rays. In general, making the lenses more concave toward the aperture flattens the two conjugate surfaces, while making the lenses less concave in this respect makes the two surfaces more concave toward the aperture.

The symmetrical system of Fig. 1 consists of the lens 12; the mirror 13 which acts as the aperture, and the image of the lens produced by the mirror. By designing the shape of lens 12 so that the symmetrical surfaces containing the conjugate points B and B' are approximately spheres with their common center of curvature at the mirror 13, the lens 12 and the mirror 13 can be rotated together through a limited angle about the axis 14 through the center of the aperture without sensibly changing the image of an object in the object surface. When this condition is met, the aperture is imaged at the light slit in a surface substantially normal to the axis of the reflected light. If the object and image surfaces are not centered at the mirror, then the image of the aperture at the light slit is not in a surface normal to the axis of the reflected light, but is on a bias, with one side of the image in sharp focus at the light slit, while the other side is out of focus in the plane of the light slit.

The dimensions of one suitable optical system are for the most part apparent from the legends and numerals applied to the various parts of Fig. 1. It will be noted that the distance between the aperture plate 10 and the mirror 13 is 1.875 inches, and the distance between the mirror and the light slit is 2 inches. The aperture of the plate 10 may be in the form of a triangle 0.530 inch wide by 0.300 inch high, the 0.530 inch dimension being in the plane of the drawing. The biconvex lens 15 may be of crystal quartz having an index of refraction of 1.558, a thickness of 0.127 inch, and radii of curvature of 1.139 inches with the optical axis of the crystal parallel to the axis of the lens. The size of the aperture of the plate 10 is determined by the overall magnification of its image in the plane of the light slit C, this value being about 0.980X when the effect of the lens 15 is included. The lens 12 may have a meniscus form, with the concave surface toward the mirror, the radius of curvature of the concave surface being 3.573 inches and the radius of curvature of the convex surface being 0.697 inch when the refraction of the glass for the D line is 1.523. The free diameter of the lens may be ½ inch and the distance from the surface of the mirror to the convex face of the lens may be of the order of 0.318 inch. The axis of the lens 12 may be tilted in a direction normal to the plane of the two axes of the system which intersect at an angle of 30°, through an angle such as 4° to 6°, to prevent reflections from the surfaces of lens 12 from entering the light slit.

Every part of the mirror 13 must of course receive light from every point of the aperture and must deliver it to the light slit at an angle of 30 degrees with the axis of the aperture and without vignetting.

Figure 2:
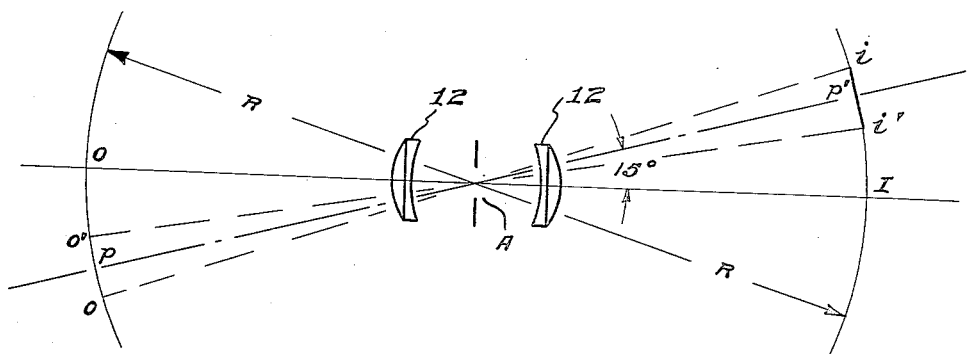
Figure 2 is an explanatory diagram relating to the operation of the arrangement of Fig. 1.

Fig. 2 illustrates in greater detail the characteristics of the lens 12. If this lens is so designed that, at unit magnification, an object surface O of radius R centered at A is imaged upon the image surface I also centered at A, then at the point $p$ (where an auxiliary axis $pp'$, at an angle of 15 degrees with the optical axis OI, intersects the object surface), it is possible to place a plane object OO' and obtain at $p'$ a rectilinear image $ii'$. Slight deviation from unit magnification does not appreciably affect the quality or effective flatness of the image. Ideally, the Petzval condition should be met by coincidence of the primary and secondary image surfaces in the surface I. It will, of course, be understood that the lens 12 may be formed of a single piece or may be formed of separate parts having different characteristics depending on the extent to which the various forms of image distortion are to be eliminated.

I claim as my invention:

1. An optical system including means forming a light aperture and a light slit centered on different axes, a reflector arranged at the interception of said axes to vibrate an image of said aperture transversely of said slit, and a lens arranged to intercept both of said axes for centering substantially at said mirror both the field of said aperture and the field of the aperture image at said slit, said lens having such radii of curvature as to have a spherical field for both the incident and reflected rays at a distance equal to its own focal length, said field having a curvature of a radius equal to the focal length of the lens.

2. An optical system including means forming a light aperture and a light slit centered on different axes, a reflector arranged at the interception of said axes to vibrate an image of said aperture transversely of said slit, and a meniscus lens arranged in said axes to center substantially at said mirror both the field of said aperture and the field of the aperture image at said slit, said lens having such radii of curvature as to have a spherical field for both the incident and reflected rays at a distance equal to its own focal length, said field having a curvature of a radius equal to the focal length of the lens.

3. An optical system including means forming a light aperture and a light slit centered on different axes, a reflector arranged at the interception of said axes to vibrate an image of said aperture transversely of said slit, and a meniscus lens arranged in said axes with its concave side facing said mirror for centering substantially at said mirror both the field of said aperture and the field of the aperture image at said slit, said lens having such radii of curvature as to have a spherical field for both the incident and reflected rays at a distance equal to its own focal length, said field having a curvature of a radius equal to the focal length of the lens.

4. An optical system including means forming a light aperture and a light slit centered on different axes, a reflector arranged at the interception of said axes to vibrate an image of said aperture transversely of said slit, and a meniscus lens arranged in said axes with its concave side facing said mirror and centering substantially at said mirror both the field of said aperture and the field of the primary aperture image at said slit, said lens having such radii of curvature as to have a spherical field for both the incident and reflected rays at a distance equal to its own focal length, said field having a curvature of a radius equal to the focal length of the lens.

5. An optical system including means forming a light aperture and a light slit centered on different axes, a reflector arranged at the interception of said axes to vibrate an image of said aperture transversely of said slit, and a lens arranged to intercept both of said axes for centering substantially at said mirror both the field of said aperture and the field of the aperture image at said slit, the optical axis of said lens being displaced in a direction normal to the plane of said intersecting axes to prevent light reflected from the surfaces of said lens from entering said slit, said lens having such radii of curvature as to have a spherical field for both the incident and reflected rays at a distance equal to its own focal length, said field having a curvature of a radius equal to the focal length of the lens.

LAWRENCE T. SACHTLEBEN.